March 23, 1954 M. G. SELLON 2,673,044
BACKLASH PREVENTING ATTACHMENT FOR FISHING REELS
Filed Oct. 18, 1952
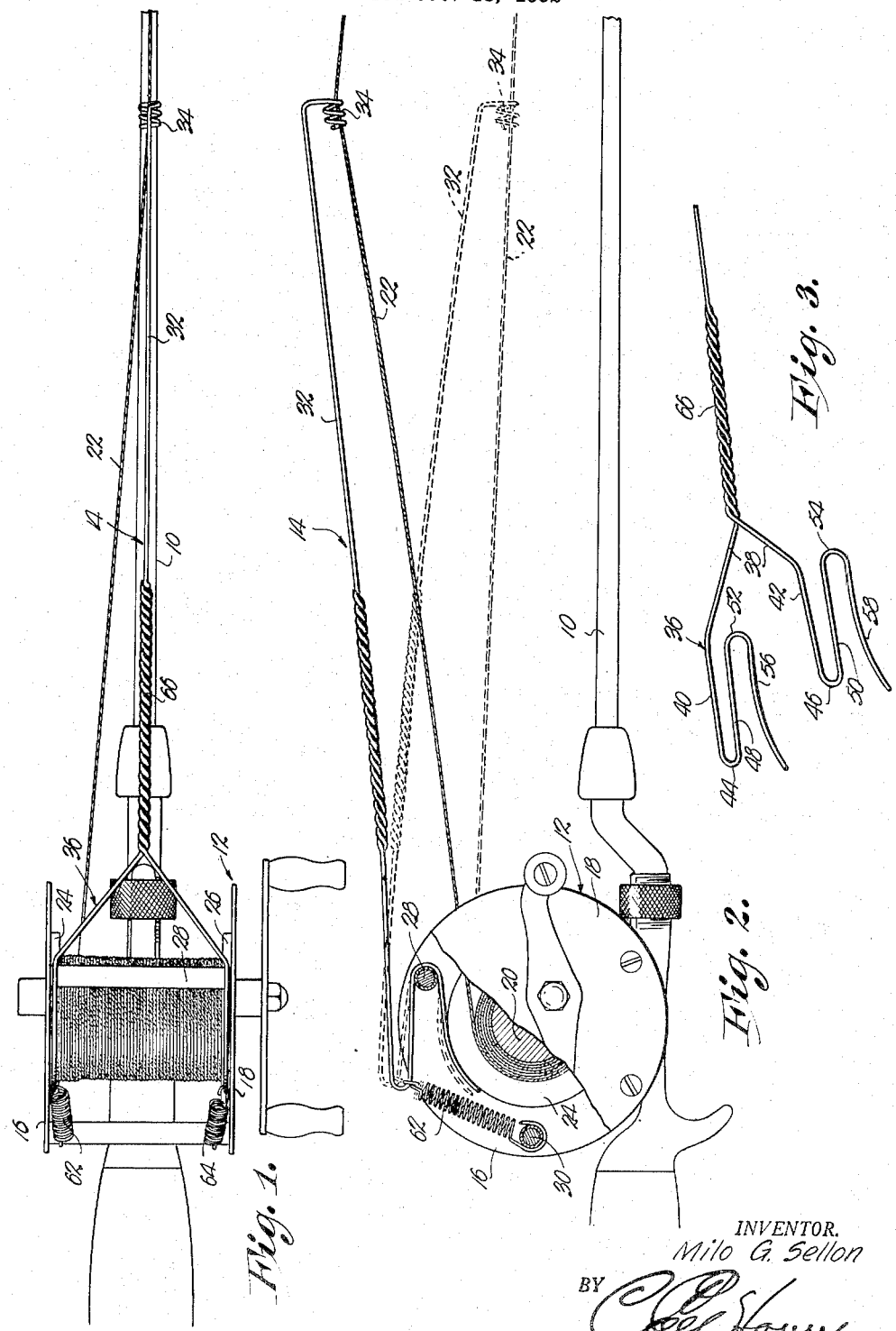
INVENTOR.
Milo G. Sellon
BY
ATTORNEY.

Patented Mar. 23, 1954

2,673,044

UNITED STATES PATENT OFFICE 2,673,044

BACKLASH PREVENTING ATTACHMENT FOR FISHING REELS

Milo G. Sellon, Kansas City, Mo.

Application October 18, 1952, Serial No. 315,545

1 Claim. (Cl. 242—84.5)

This invention relates to improvements in fishing tackle and has for its primary object to provide an anti-backlash device that is readily attachable to virtually any type of fishing reel and therefore, is universally usable in the field.

The most important object of this invention is to provide a lightweight, inexpensive, simple anti-backlash attachment that is positive in its operation and automatic to the extent that the drum of the reel is braked thereby at the precise moment during normal casting operations when the line normally ceases to feed at the rate of rotation of the reel.

It is another important object hereof to provide anti-backlash structure that may be quickly and easily attached to the cross rods of the frame of a reel in operating relationship to the drum thereof without need of disassembling and without the necessity of tools and other equipment.

A still further object hereof is to provide anti-backlash means having springs for yieldably holding the brake of the attachment biased against the drum so that the same is in braking relationship thereto whenever the line is loose.

In the drawing:

Figure 1 is a top plan view of a backlash preventing attachment for fishing reels showing the same operably mounted on the reel.

Fig. 2 is a side elevational view thereof, parts of the reel being broken away and in section for clearness; and Fig. 3 is a fragmentary, perspective view of the entire attachment except the springs, entirely removed from the reel.

A fishing rod 10, having a fishing reel 12 thereon, has been chosen for illustration of the manner of mounting and use of the anti-backlash attachment forming the subject matter hereof and broadly designated by the numeral 14.

Reel 12 is of conventional construction in that the same has a frame attached to the rod 10 and including a pair of spaced-apart plates 16 and 18 between which a drum 20 for line 22 is rotatably mounted, drum 20 being provided with a pair of spaced-apart rims 24 and 26 in the usual manner. Furthermore, reels 12 of this character are normally provided with a plurality of cross rods interconnecting the plates 16 thereof, two of such rods being designated by the numerals 28 and 30 respectively.

The attachment 14 for preventing entanglement of the line 22 with the drum 20 is Y-shaped, presenting an elongated shank 32 having a line-receiving eye on one end thereof that takes the form of a coil 34 for slidably receiving the line 22. By virtue of the use of a coil, it is unnecessary to remove the line 22 from the drum 20 or remove the hooks and other attachments from the line 22 in order to thread the same through the eye means 34.

A yoke broadly designated by the numeral 36 on the opposite end of the shank 32 has a pair of diverging stretches 38 terminating in a pair of spaced-apart legs 40 and 42. Legs 40 and 42 are in parallelism and spaced to fit between the plates 16 and 18 in direct overlying relationship to the rims 24 and 26 as shown in Fig. 1. Legs 40 and 42 terminate in loops 44 and 46 respectively that open toward the shank 32 and these loops in turn terminate in arms 48 and 50 respectively. Arms 48 and 50 are in direct underlying parallelism with the legs 40 and 42 and terminate in loops 52 and 54 respectively, these loops opening oppositely to the loops 44 and 46.

Brakes 56 and 58 for rims 24 and 26 respectively, are integral with the corresponding loops 52 and 54 and are in direct underlying relationship to the arms 48 and 50. Brakes 56 and 58 are arched upwardly toward the arms 48 and 50 and conform to the arcuate peripheries of the rims 24 and 26.

It is seen that the entire attachment 14 is made from lightweight wire or rod stock and that the shank 32, coil 34, leg 40, loop 44, arm 48, loop 52 and brake 56, are all formed from a single stretch of wire. Likewise, the leg 42, loop 46, arm 50, loop 54 and brake 58 are integrally interconnected and joined with the shank 32 to form a part thereof by twisting as at 66. As shown in Fig. 2 of the drawing, when the attachment 14 is mounted on the reel 12, the loops 52 and 54 partially surround the uppermost tie rod 28, rendering the brakes 56 and 58 swingable toward and away from the rims 24 and 26 on the longitudinal axis of the tie rod 28 with the shank 32 swinging therewith. Brakes 56 and 58 are yieldably biased against the rims 24 and 26 by the provision of a pair of springs 62 and 64 connected to one end thereof with the tie rod 30. The opposite ends of the springs 62 and 64 are connected with loops 44 and 46 respectively.

When the line 22 is taut, as shown by dotted lines in Fig. 2, the coil 34 is pulled toward the rod 10 to rotate the loops 52 and 54 on the cross rod 28 against the action of springs 62 and 64, thereby moving the brakes 56 and 58 out of engagement with the rims 24 and 26. When the line 22 is loose, as shown by full lines in Fig. 2 of the drawing, the springs 62 and 64 yieldably hold the brakes 56 and 58 in frictional contact with the rims 24 and 26 and thereby tend to restrain the drum 20 against rotation.

The attachment has a twofold function and purpose. Primarily it serves its purpose of preventing backlash, and secondarily, it holds the drum 20 from rotation when the tackle is not being used and while the fisherman is waiting for a strike. It is recognized that backlash occurs during casting unless the drum 20 is restrained against rotation at the proper time during the casting stroke. As long as the line 22 is payed out at the same rate as the rate of rotation of drum 20, there will be no backlash. However, when the line 22 becomes loose, while drum 20 is still rotating, counter-winding of the line 22 takes place on the drum 20. Thus the attachment 14 hereof operates automatically to stop the drum 20 from rotating at the precise moment when line 22 becomes loose during casting operation as shown by full lines in Fig. 2 of the drawing.

Having thus described the invention what is claimed as new and desired to be secured by Letters Patent is:

For fishing reels having a pair of spaced plates, a plurality of tie rods joining the plates, and a line-receiving drum between the plates and rotatably carried thereby, the drum having a pair of spaced rims, an anti-backlash attachment comprising a Y-shaped member having a shank and a yoke on one end of the shank; a line-receiving coil on the opposite end of the shank, said yoke having a pair of spaced legs, each provided with a loop on one end thereof; an arm secured to each loop respectively and normally underlying a corresponding leg, each arm having a loop opening in the opposite direction from the loop of the corresponding leg; an arcuate brake for each rim respectively, each brake normally underlying a corresponding arm and being secured to the loop of the latter, the loops of the arms being adapted to partially surround one of said tie rods to swingably mount the member on the reel for swinging movement of the brakes to and from a position engaging the rims; and a spring for connecting each loop of the legs respectively with a second of said tie rods, said springs extending from the loops of the legs in the opposite direction from said shank to yieldably hold the brakes biased against the rims.

MILO G. SELLON.

References Cited in the file of this patent

UNITED STATES PATENTS

| Number | Name | Date |
|---|---|---|
| 2,374,551 | Margis, Jr. | Apr. 24, 1945 |
| 2,600,939 | Torrence | June 17, 1952 |

FOREIGN PATENTS

| Number | Country | Date |
|---|---|---|
| 204,358 | Great Britain | Sept. 24, 1923 |
| 427,443 | Great Britain | Apr. 24, 1935 |